(12) United States Patent
Paul

(10) Patent No.: US 6,619,053 B1
(45) Date of Patent: Sep. 16, 2003

(54) METHOD FOR REGULATING THE CLIMATE IN A ROOM

(75) Inventor: Joachim Paul, Flensburg (DE)

(73) Assignee: Integral Energietechnik GmbH, Flensburg (DE)

( * ) Notice: Subject to any disclaimer, the term of this patent is extended or adjusted under 35 U.S.C. 154(b) by 0 days.

(21) Appl. No.: 10/110,005

(22) PCT Filed: Oct. 5, 2000

(86) PCT No.: PCT/DE00/03494

§ 371 (c)(1),
(2), (4) Date: Apr. 8, 2002

(87) PCT Pub. No.: WO01/27541

PCT Pub. Date: Apr. 19, 2001

(30) Foreign Application Priority Data

Oct. 8, 1999 (DE) .......................... 199 48 654

(51) Int. Cl.[7] .......................... F25D 17/06; F25D 17/00; F25D 17/04

(52) U.S. Cl. .................. 62/92; 62/97; 62/179; 62/413; 62/415

(58) Field of Search .............. 62/92, 97, 179, 62/413, 415

(56) References Cited

U.S. PATENT DOCUMENTS

| 3,812,685 A | * | 5/1974 | Brown | 62/93 |
|---|---|---|---|---|
| 3,890,797 A | * | 6/1975 | Brown | 62/91 |
| 4,103,508 A | * | 8/1978 | Apple | 62/92 |
| 4,135,370 A | * | 1/1979 | Hosoda et al. | 62/274 |
| 4,237,696 A | * | 12/1980 | Coblentz | 62/93 |
| 4,594,855 A | * | 6/1986 | Gunther | 62/92 |
| 5,408,838 A | * | 4/1995 | Yaeger et al. | 62/92 |
| 5,457,963 A | * | 10/1995 | Cahill-O'Brien et al. | 62/78 |
| 5,701,950 A | * | 12/1997 | Imamura et al. | 165/222 |

FOREIGN PATENT DOCUMENTS

| JP | 54142855 A | * | 11/1979 | F24F/11/02 |
|---|---|---|---|---|
| JP | 56042039 A | * | 4/1981 | F24F/3/14 |
| JP | 57182034 A | * | 11/1982 | F24F/3/14 |

* cited by examiner

*Primary Examiner*—William C. Doerrler
*Assistant Examiner*—Filip Zec
(74) *Attorney, Agent, or Firm*—Larson & Larson, PA; James E. Larson

(57) ABSTRACT

A method for adjusting and maintaining a desired room climate with regards to temperature, humidity, and carbon dioxide concentration at a given charge of heat, humidity, and carbon dioxide. A proportionate amount of outer air is cooled to a saturation temperature and then dehumidified. The saturation temperature results from the intersecting point of the saturation curve of humid air, and a straight line which extends through the point of state of the air being in the state of the desired climate of the room air, and the point of state of the available outer air in an h,x diagram, i.e., provided with a rise of the quotient of the heat charge in relation to the humidity charge.

5 Claims, 8 Drawing Sheets

METHOD FOR REGULATING THE CLIMATE IN A ROOM

PRIOR APPLICATIONS

This application bases priority on International Application No. PCT/DE00/03494, filed Oct. 5, 2000, which bases priority on German Application No. DE 199 48 654.9, filed Oct. 8, 1999.

BACKGROUND OF THE INVENTION

1. Field of Invention

The invention relates to a method for air conditioning a room.

2. Description of the Prior Art

It is desirable to set a comfortable climate within rooms, i.e., to attain an environmental condition in which the thermal, physical and hygienic parameters are within limits, which lead to no or only statistically minor objections, and which are even felt extremely pleasant. The desired comfortable room climate is mainly brought about by air conditioning and ventilation systems.

Equipment conditioning the room climate as regards to temperature and humidity are normally known as air conditioning systems. Another factor influencing the room climate is the pollutant dilution with respect to the removal of anthropogenic $CO_2$, together with other pollutants, such as odors, air-foreign substances, etc. In addition, water or water vapor must be removed as a result of respiration, perspiration, etc. There must also generally be a removal of heat from the room as a result of heat transmission by human or mechanical heat sources therein.

The removal of these heat, humidity and pollutant loads or charges is compensated by conditioned supply air in the room in order to maintain a sought room air state. Particularly, the desired removal of pollutants requires the supply of cleaner air, which is generally taken from the environment in the form of so-called external air, and whose quantity is determined by the internal air concentration increase as a function of the concentration in the external air.

Hitherto, this external air supply has been obtained using air treatment systems (hereinafter called "air conditioning systems"), which ensure a clearly defined room air state as a result of the supply of external air, the removal of room air, as well as by cooling and heating external and/or room air.

German patent no. DE 36 10 069 A1 discloses a method for air conditioning a room, which is determined by the actual values heat load, humidity load and carbon dioxide load, and the desired values temperature, humidity and carbon dioxide concentration, in which the external air is cooled to a saturation temperature and, consequently, dehumidified.

It is also known from Recknagel, Sprenger Schramek, Taschenbuch fur Heizung und Klimatechnik, Oldenburg, 1999, pp 310–312, 325, and 327, to regulate the room climate towards the carbon concentration.

The problem of the present invention is to provide a method for the air conditioning of a room involving limited apparatus costs and limited energy costs, which with regards to its hygienic quality, particularly the carbon dioxide concentration, is improved compared with existing air conditioning systems.

SUMMARY OF THE INVENTION

According to the invention, this problem is solved by the features of claim 1, whilst advantageous developments of the invention are given in the subclaims.

The invention is based on the consideration that is exclusively the supplied external air is cooled, with regards to the temperature and atmospheric humidity, it is possible to obtain a desired and comfortable value to which is supplied feed air precisely defined in its state. The heat load can be given as ah in kJ/kg and the humidity load as Δx in gram water/kg of dry air in the h,x diagram, said values being representable as distances in the h,x diagram. The supply air state must be so chosen with regards to temperature and atmospheric humidity that it can absorb the heat load Δh and the humidity load Δx. The mixing point of supply air and room air (hereinafter called "mixed air") must consequently, starting from the room air, be lower by Δh and Δx.

With regards to the atmospheric humidity, the supply air state is fixed in such a way that it is saturated with water vapor. Thus, if an interconnection takes place in the diagram of the room air state point and the mixed air, then a mixing line is obtained, whose intersection with the saturation line corresponds to the humid air state (hereinafter called "supply air" state). As the h,x diagram only gives intense quantities, the supply air quantity (as a mass or volume flow in kg or $m^3$ per time unit) must be separately calculated. The supply air quantity is higher than corresponds to the standard hygienic rules concerning the carbon dioxide content. Therefore, the room air is not only at the desired temperature and atmospheric humidity value, but also has a lower carbon dioxide content and is, consequently, more hygienic.

Such a method has not hitherto been used in the prior, and in fact, in.conventional air conditioning systems re-circulated air or mixed air, i.e., re-circulated air and the necessary external air, are dehumidified by cooling to such an extent that as supply air they can absorb the humidity load. However, such a low air temperature is reached that it is necessary to reheat the air. This reheating requires additional apparatus costs, which in turn, leads to unnecessary energy costs.

A cooling of exclusively external air to a low temperature, according to the invention, has hitherto been subject to the objection that it required particularly expensive, special cooling methods, which increase the apparatus and energy costs to such an extent that the apparatus and energy costs caused by reheating appeared more favorable.

However, according to the invention, through the use of a pumpable ice/liquid mixture, the possibility is created of attaining a random state point of the air in the h,x diagram, while bringing about the additional advantage of a small heat exchanger surface.

It is also advantageous that an external air flow is subdivided into two air flows after passing through a valve. Optionally, fans can be provided for promoting said air flows. Only a partial flow is cooled in a heat exchanger to such an extent that it can be mixed in a mixing chamber with the first partial flow and the temperature after passing through the heat exchanger, and the partial flow ratio between the partial flows is chosen in such a way that the so-called mist or fog region is attained in the mixing chamber.

In the mixture is formed a mist, which separates with a device the water in a removal line. Another removal line already exists in the cooling device.

The device dehumidifying the mist can operate e.g. by means of capillary forces as a wick or fibre mat or using so-called demisters (regularly or irregularly), devices made from metal, plastic or knitted fabric and which are also known as "demister candles". Thus, only a small volume flow has to pass via a heat exchanger, and consequently, the latter can be manufactured with a smaller surface area than would be the case if the entire air flow was passed through the same.

There is no longer a need to heat one of the partial flows following the separation of water, as has previously been the case.

The further desired cooling is achieved in an energy-favorable manner, if as the cold supply of the air cooler use is made of a cooling agent of pumpable, liquid slush ice which is, in any case, produced at temperatures below the freezing point of water, and here brings about a pronounced air cooling so that a larger air flow can be supplied in an un-cooled direct manner for dehumidification. Such a slush ice can be stored, and consequently, requires a reduced installed capacity.

The introduction of supply air into the room should not take place in unmixed form, because the cold dry air gives rise to an unpleasant feeling for persons in the room. It is more particularly proposed that the treated air be allowed to enter a nozzle through a regulating valve, and is introduced in mixed air form into the room.

A conical sleeve, displaceable with respect to the nozzle along the extension thereof, permits the induction of room air. A further air jet outside and along the sleeve is mixed with the induced air and forms an air jet, whose volume and temperature are controlled, but which essentially corresponds to the room temperature.

Upstream of the nozzle is provided a valve, whose adjustment and fixing of the displacement of the sleeve permits determination of the introduced volume, as well as the nature and quantity of induced room air so that desired room air conditions are obtained in a residence zone.

Preferably, the introduction nozzles are fitted to the ceiling of the room, and in the room the entrance doors can have a so-called air shower so that persons entering the room in a highly heated state rapidly become accustomed to a cooler room climate, because at some distance from the door there is greater mixing with the room air. Simultaneously, the known door effects, namely the introduction of warm air, can be prevented by such an air shower. Optionally, both the supply-regulating valve and the adjustable cone displacement can be remotely controlled.

To maintain the necessary dehumidification, it was hitherto necessary to cool all the supplied air to below the dew point, allow water vapor to condense, and then re-warm the air. However, this requires much more energy.

In a h,x diagram (Mollier diagram), the mixing line should run between the point of desired room air state (characterized by the air pressure, room air temperature and humidity), and the point of the air state of the external air cooled to percentage humidity. A gradient is obtained, which is described by $q/\Delta x$, q being the heat load in kJ/kg and $\Delta x$ the humidity load in gram $H_2O$/kg of dry air.

DESCRIPTION OF THE DRAWINGS

Further features and advantages of the invention can be gathered from the following description of a preferred embodiment with reference to the attached drawings, wherein it is shown that.

DETAILED DESCRIPTION OF THE PREFERRED EMBODIMENT

Figure 1:
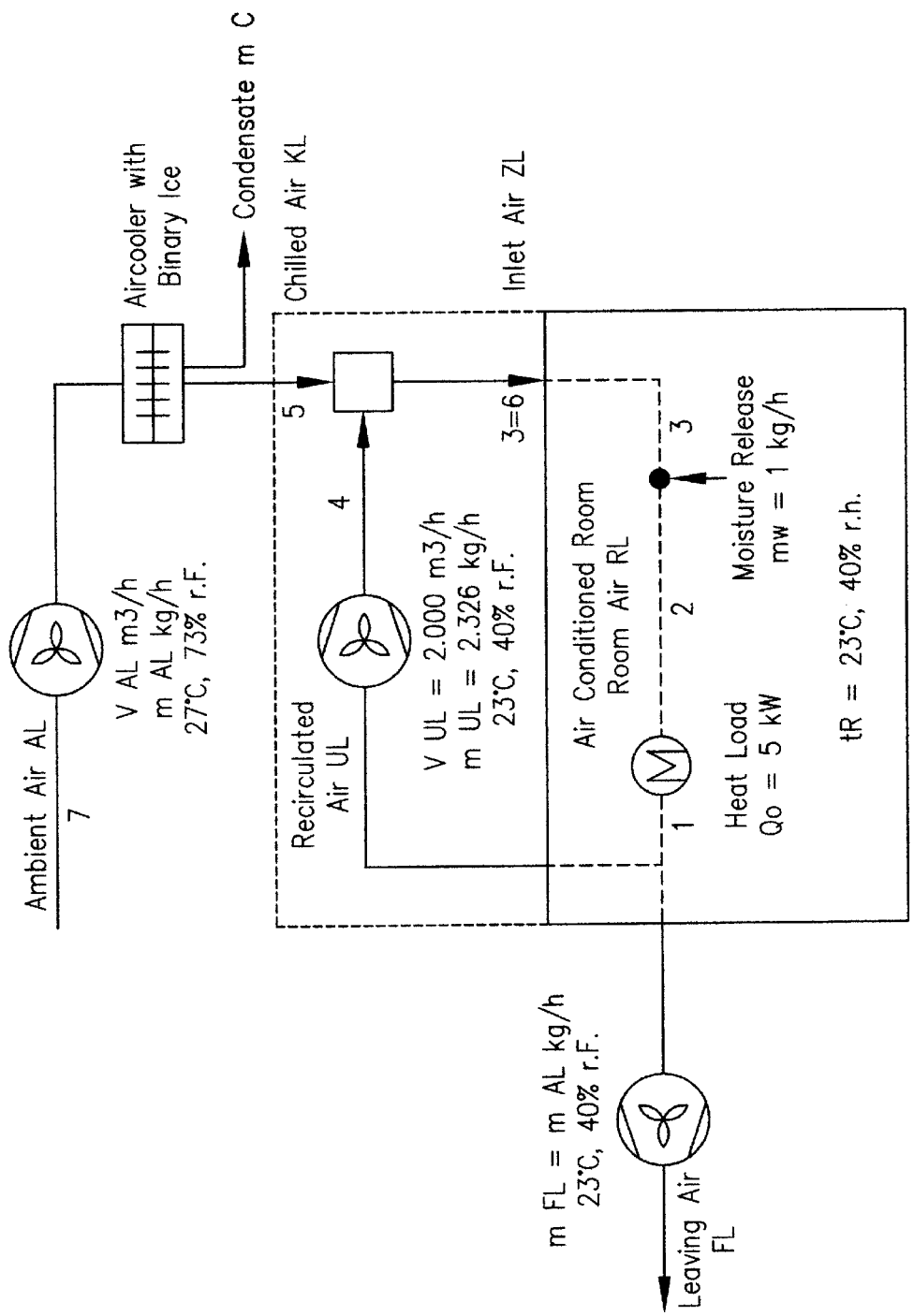
FIG. 1 shows a diagrammatic structure of an air conditioning system according to the method of the invention.

An external air flow 7, (ambient air), e.g. having a temperature of 27° C. and 73% relative humidity, is sucked in for a room. The volume flow is given at the end of the calculation. According to the invention, said air is cooled by means of an air cooler to below the dew point using a liquid ice mixture, and a condensate then forms, which is removed (FIG. 1).

The external air flow and the removed condensate quantity are chosen in such a way that in the room are maintained a desired comfortable air temperature and air humidity of e.g. 23° C. and 40% relative humidity, in that the cooled and dehumidified air can precisely absorb the heat load $\Delta h$ and humidity load $\Delta x$. Part of the room air is removed as exhaust air to the same extent as external air is supplied to the room.

The supplied external air is cooled in a heat exchanger, i.e., to a saturation temperature, and is thereby dehumidified, and which in the h,x diagram at the intersection of the saturation curve of the humid air and the extension of a line through the state point gives the desired room air, said line having to pass through a point obtained in that the room air state point in $\Delta h$ (heat load) is reduced and the state point resulting therefrom is reduced by $\Delta x$ (humidity load).

Cooled, dehumidified external air can be supplied to the room either directly or by admixing re-circulated air (air flow 4) indirectly in the form of supply air, the supply in the room being such that there are no undesired draughts as a result of an excessive air velocity and/or excessively low air temperatures.

In the case of the direct supply of the cooled, dehumidified air to the room in the form of supply air, the cooled, dehumidified air 5 is advantageously mixed with a re-circulated room air partial flow and said mixed air enters the room as supply air, the re-circulated air volume flow being arbitrary.

Figure 2:
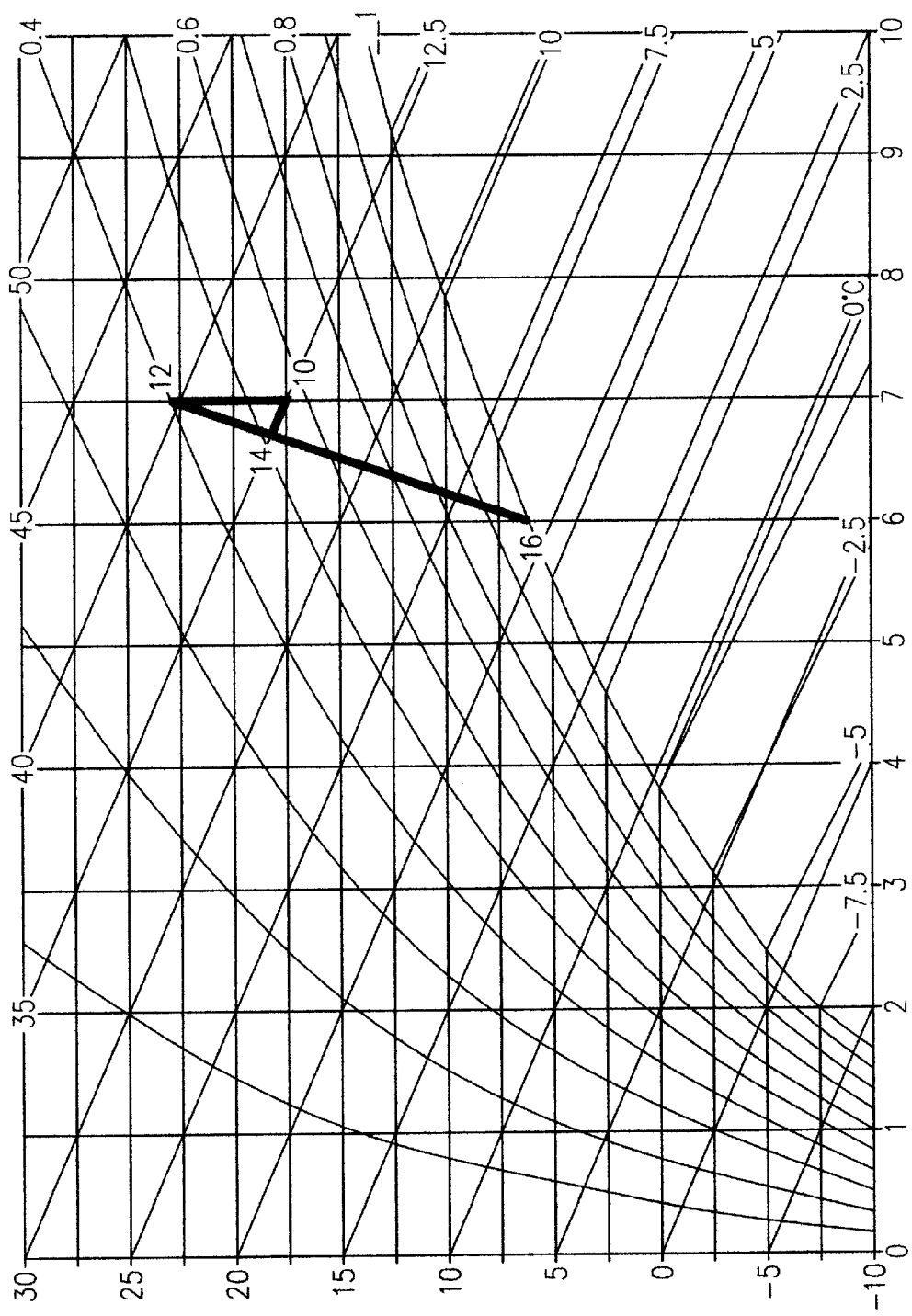
FIG. 2 shows an h,x diagram for the air conditioning system of FIG. 1.

With the direct supply of cooled, dehumidified air it must mix as supply air in said room with the room air, whereas with an indirect supply of cooled, dehumidified air mixing takes place outside the room in a mixing chamber, where the partial flows 4 and 5 are mixed to give treated supply air. In both cases, the determination of the supply air state in the h,x diagram is the same (FIG. 2). The gradient and position of the mixing line is determined from a triangle 10, 12 and 14. Starting from a point 12, which represents the room air state to be maintained, the point 10 from the heat load h is determined, in that point 12 is reduced by amount $\Delta h$. Point 14 is determined from the humidity load $\Delta x$, in that point 10 is reduced by the amount $\Delta x$, which gives the point 14.

From the now known points 12 and 14, it is possible to plot the mixing line which intersects the saturation line of moist air at point 16. This point 16 is the necessary state point for the cooled, dehumidified air, which in the case of direct supply enters the room as supply air 3 or 6, or in the case of indirect supply enters as 5 into the mixing chamber and then is supplied to the room as supply air. Thus, point 16 indicates to what low saturation temperature the external air must be cooled in order to maintain the required room air conditions.

Figure 3:
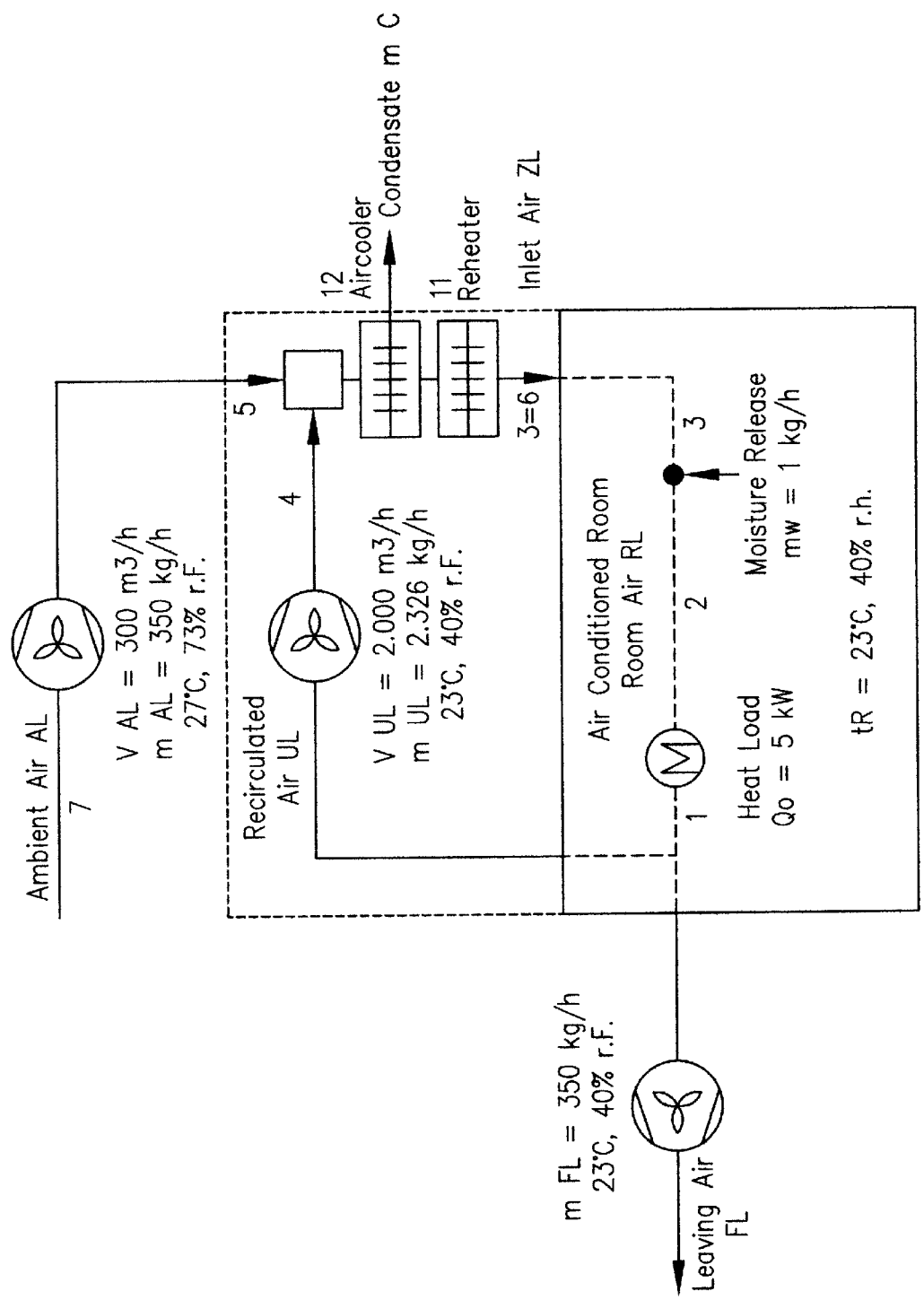
FIG. 3 shows a conventional air conditioning system.

FIG. 3 describes the conventional method. The external air flow 7, which is stipulated for hygienic reasons (e.g. 300 m³/h for 10 persons) is mixed as 5 with re-circulated air 4 and subsequently dehumidified by cooling. The air with the lower water vapor content is admittedly suitable for maintaining the atmospheric humidity in the room, but as a result of the necessary cooling, is too cold and must consequently be rewarmed, otherwise it would not be possible to maintain a desired room temperature, i.e., the room would become increasingly cold.

Figure 4:
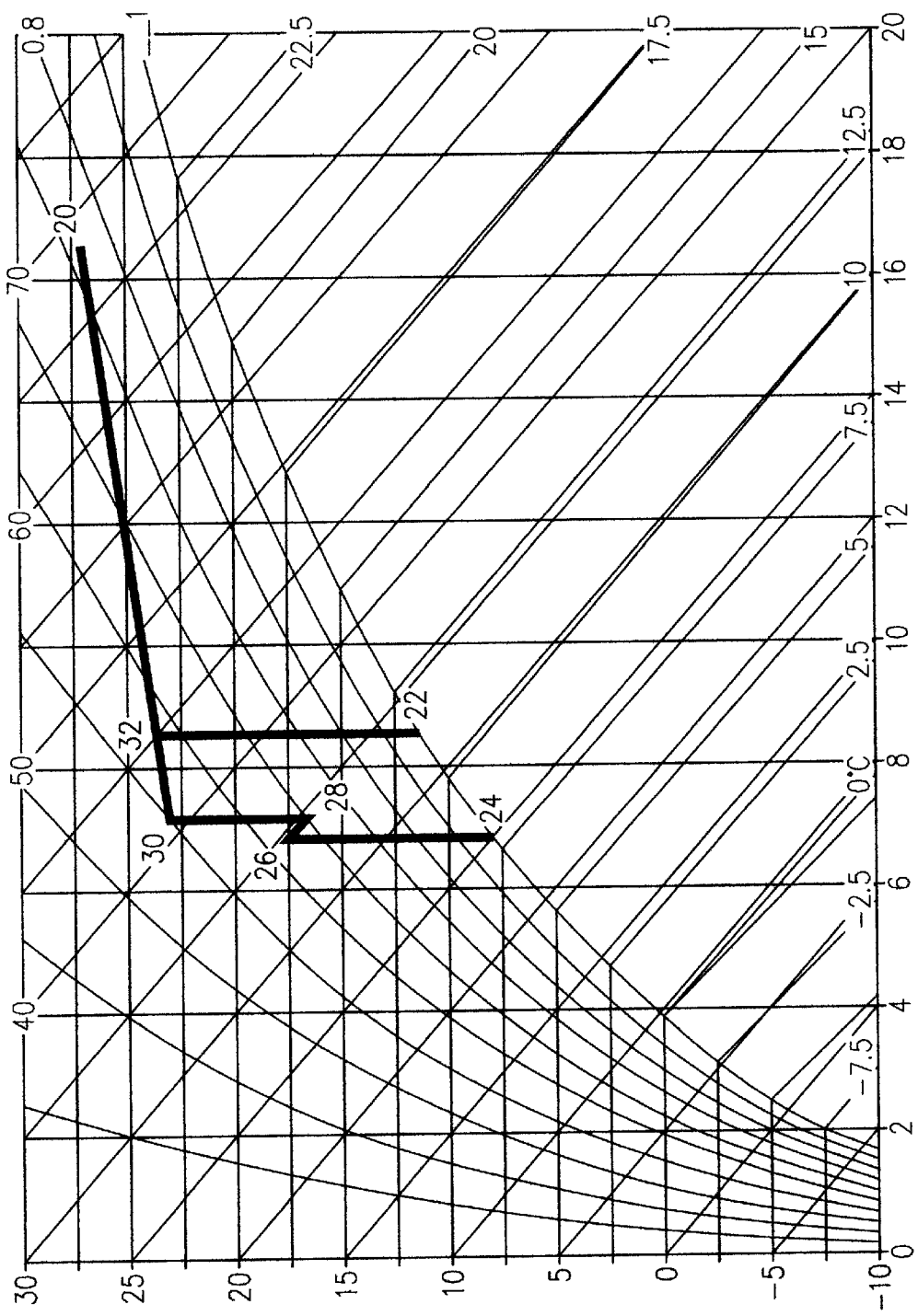
FIG. 4 shows an h,x diagrammatic representation of the heat load (h) and the humidity load (x) as measured in distances according to the structure shown in FIG. 3.

FIG. 4 shows the pattern of the state changes of the air flows in the h,x diagram. External air from state 20 and re-circulated air from state 30 (as regards temperature and atmospheric humidity identical with the room air) are mixed and reach the mixing point 32. This mixed air must be brought to a water vapor content corresponding to that of points 24 and/or 26. As in the construction according to the invention the necessary state of the supply air flow, starting from the room air 30, is determined by correction by Δh (point 28) and Δx (point 26). Said point 26 is now obtained in that air is brought from state 32 to state 24 by cooling, (−>22) and water vapor condensation (−>24). The now too cold air relative to state 24 must be brought to state 26 by re-warming.

Figure 5:
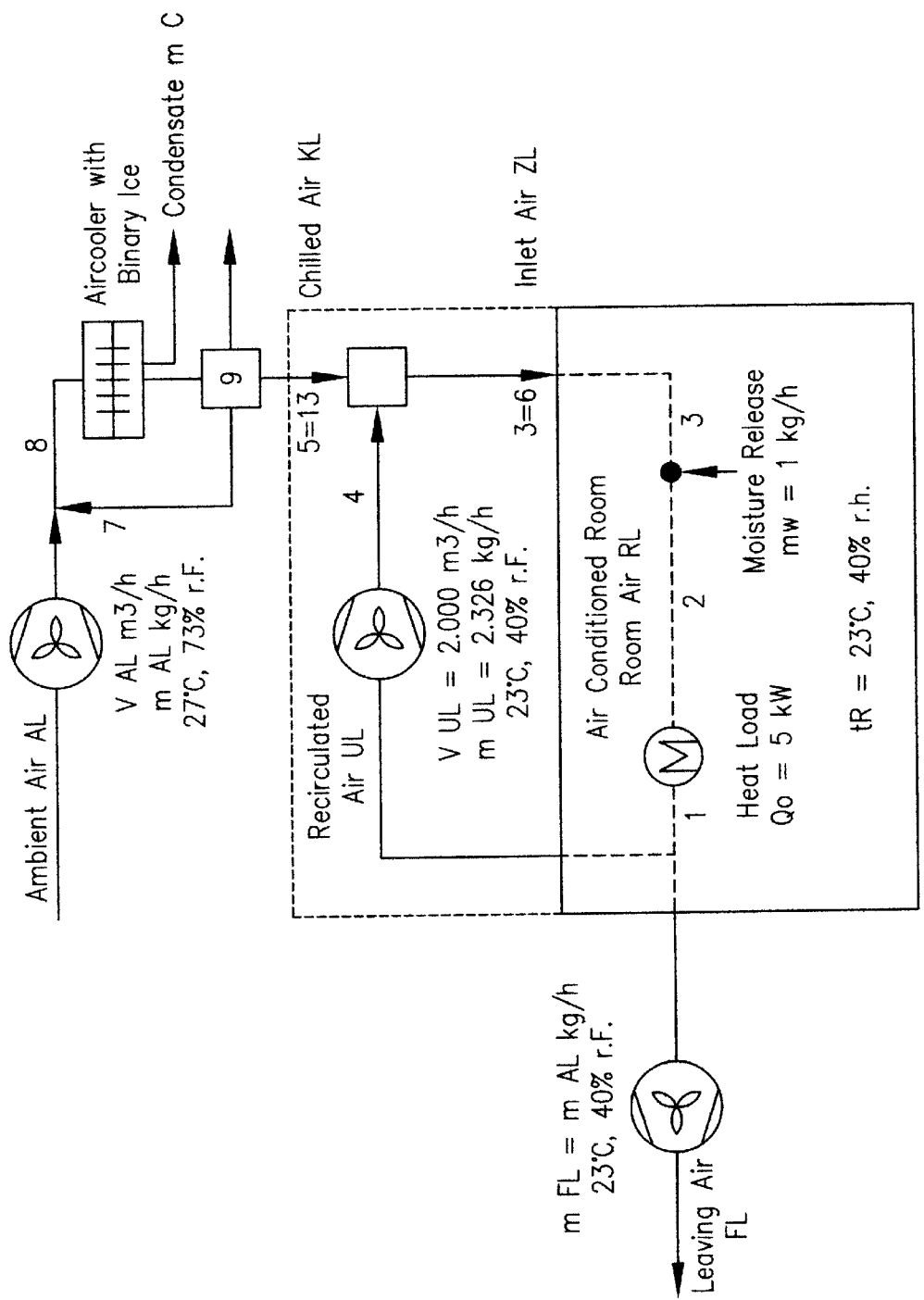
FIG. 5 shows a second embodiment of the invention.

A variant of the invention is shown in FIG. 5. The difference is that the external air flow is subdivided into two partial flows, one part 7 remaining untreated and the other part 8 is cooled to such an extent that the mist region is reached on mixing said partial flows in a mixing chamber 9.

Figure 6:
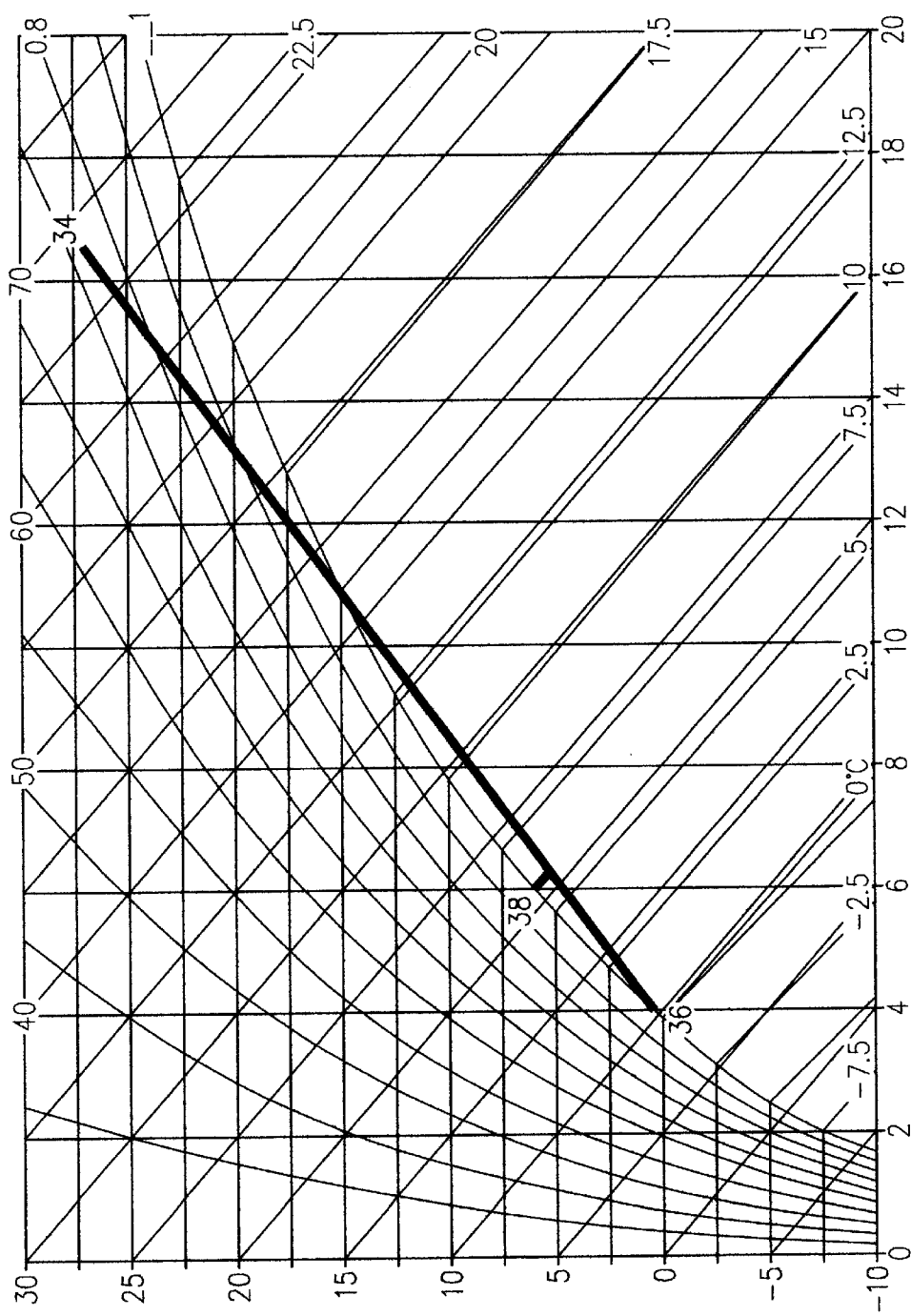
FIG. 6 shows an h,x diagram for cooling with an air conditioning system having the structure according to FIG. 5.

FIG. 6 shows how on mixing two air flows of states 34 partial external air flow 7 of FIG. 5) and 36 (partial, cooled external air flow 8 of FIG. 5) a mixing point is reached on the mixing line which, considered geometrically, is below the saturation line. During mixing additional water vapor is obtained in liquid form (namely as mist), which can be removed from 5, which leads to an end point 38 resulting from the mixing point. With regards to the temperature and atmospheric humidity (saturated), said point 38 is identical with air state 16 of FIG. 2. The advantage of this construction is that an even smaller air volume has to be cooled.

The invention according to FIGS. 1 and 2, and FIGS. 4 and 5, has the advantage that on the basis of the exemplified figures and compared with the conventional method, it is only necessary to cool approximately one third of the air volume, an approximately 2.5 times higher external air rate is supplied, which considerably improves the hygienic conditions, whilst simultaneously the cooling capacity is 20% less and no heating capacity is required, and as a result, approximately 20% less electric current is needed.

Figure 7:
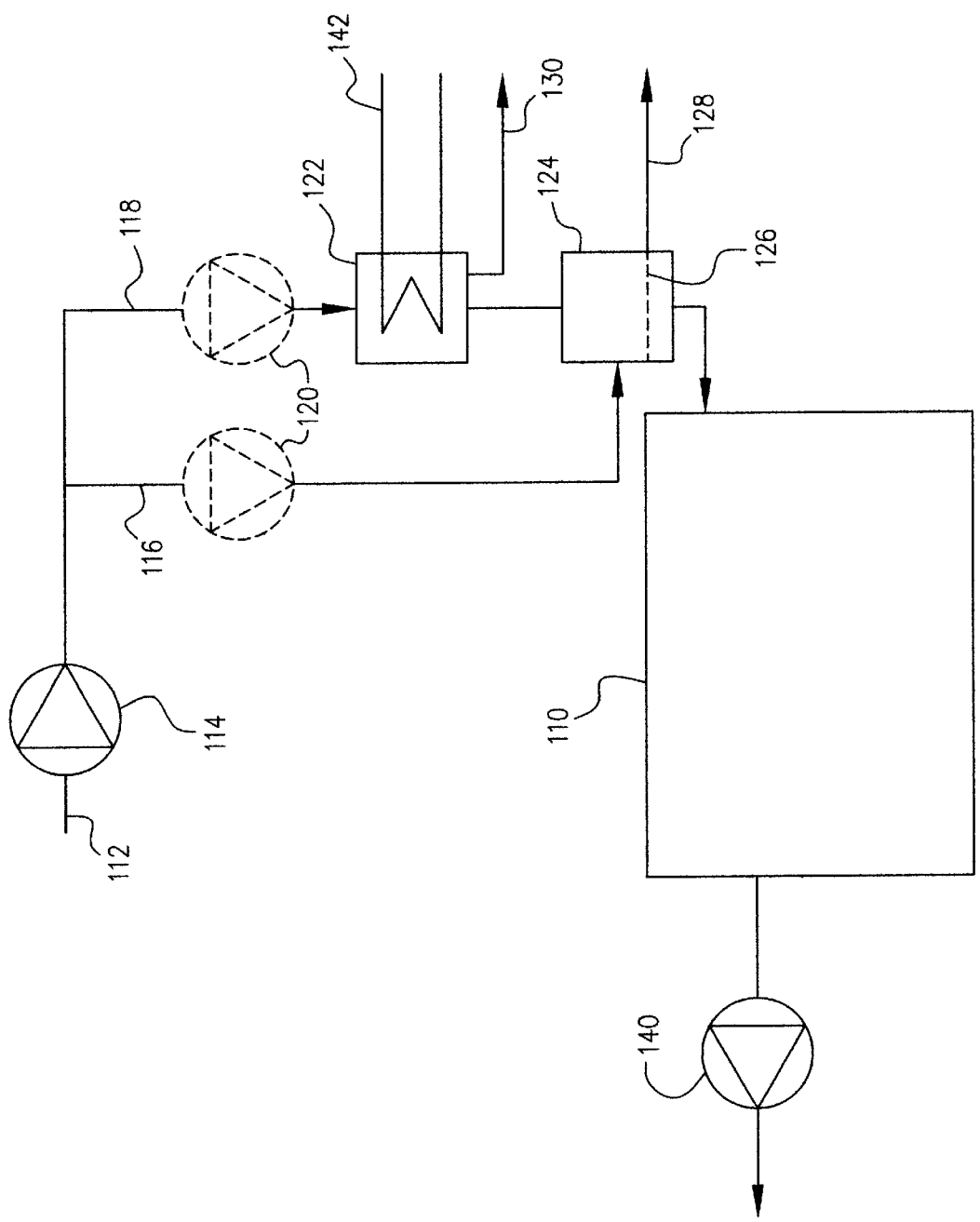
FIG. 7 shows a diagrammatic representation of the air cooling method.

In FIG. 7, reference numeral 110 indicates the room to be cooled and in it air exhaustion or suction takes place by means of a device 140. Supplied air can be obtained from the environment 112 with the aid of a device 114 and only a small partial flow 118 which, in the case of insignificant cooling, need only be dimensioned in such a way that mist formation occurs in the device 124 and passage occurs over a heat exchanger 122, which is advantageously cooled with slush ice which is supplied and removed by means of lines 142.

Instead of e.g. a 14.9 kW capacity for cooling to the dew point and a further 7.1 kW warming capacity, in the case of an internal room temperature of 23° C., with a 40% relative humidity (and a further heat source of 5 kW and humidity source of 1 kg/h located therein), compared with an external temperature of e.g. 27° C. and an external humidity of 73% relative humidity (phi AL), only a 12.2 kW capacity without any warming capacity is required.

To assist the air flow in the individual partial lines for the air flows 116 and 118, preferably, in each case, fans 120 are provided. Through the mist formation in device 124, humidity removal takes place by means of a demister 126, which using removal lines 128 directly discharges the water from the process.

Figure 8:
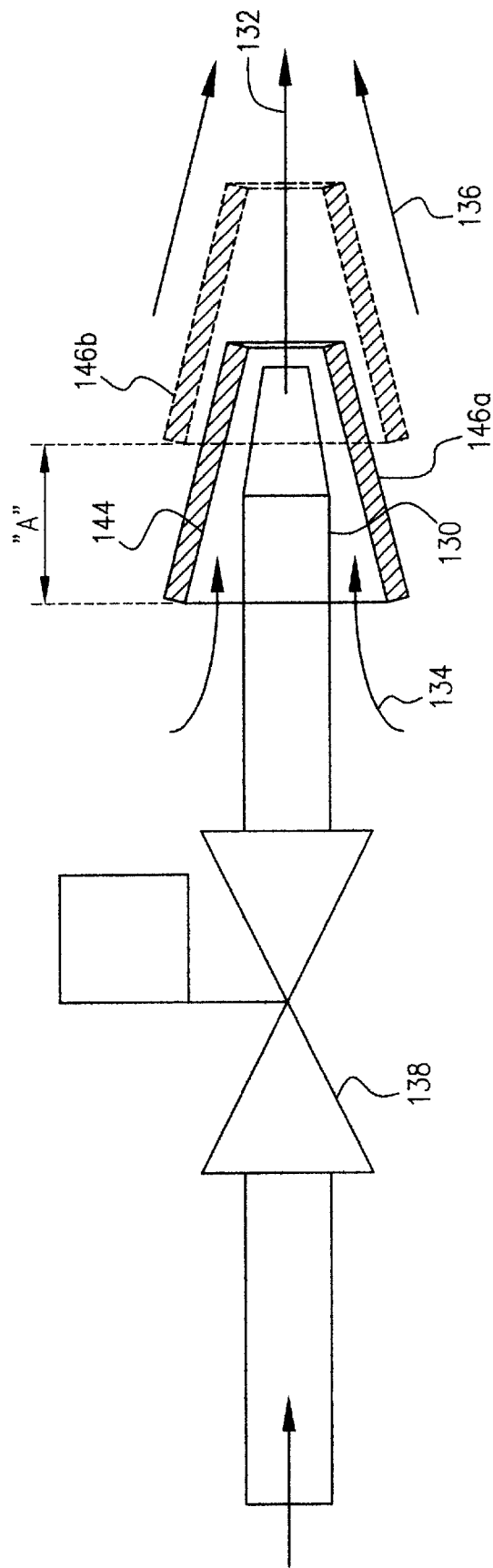
FIG. 8 shows a diagrammatic representation of the discharge nozzle for the thus conditioned air.

Finally, between the dehumidifier 124 and the cooled room 110, is provided the mixing device for mixing with the room air shown in FIG. 8, using a nozzle 130, whose end is conical, and over said end is placed an inner wall 144 of a sleeve 134 running parallel thereto and which is in turn displaceable by a distance A along the nozzle to provide different admixtures of a room air flow 134, 136. Upstream of the nozzle is provided an actuating valve 138 for regulating the supplied air quantity.

The partial flow 118 is cooled in a heat exchanger 122 to such an extent that it can be mixed in a mist forming device 124 with the first partial flow 116 and the temperature after passing through the heat exchanger 122 and the partial flow ratio between the partial flows, designated by reference numerals 116 and 118, are to be chosen in such a way that the so-called mist region is reached in device 124.

The mist obtained is dehumidified by means of the adiabatically demisting device e.g. by means of capillary forces in the form of a wick or fibre mat or using so-called demisters. It is possible in this way for only a small volume flow (namely 118) to have to be passed over the heat exchanger 122 and consequently the latter can be manufactured with a smaller heat exchanger surface area than would be the case if the entire air flow had to be passed through.

Nevertheless, there is still a more than adequate extraction of water from the entire air flow. The simultaneous cooling can take place by means of a cold supply to the air cooler using pumpable liquid slush ice, which is produced at temperatures below the freezing point of water and brings about a very marked cooling of the air, so that a larger air flow can be supplied un-cooled and directly for dehumidification.

It is particularly advantageous that the external air flow 112, after passing through a valve 114, is subdivided into two air flows, whose line paths are 116 and 118. optionally, fans 120 can be provided for promoting these air flows.

For introducing the supply air into the room, it is in particular proposed that the treated air be allowed to pass through a regulating valve into a nozzle 130 and is introduced into the room as a supply air jet 132.

A conical sleeve 146a and 146b, which is displaceable by A with respect to the nozzle 130 along the extension thereof, permits the induction of room air, which is sucked to the outside at point 134. Another air jet 136 outside along the sleeve, in the same way as the air jet 134, is then mixed with the induced air and forms an air jet with a controlled volume and temperature, but which essentially already corresponds to the room temperature.

Upstream of the nozzle is a valve 138, and as a result of whose adjustment and by fixing the displacement of the sleeve 134, it is possible to determine the introduced volume, as well as the nature and quantity of the induced room air so that in a residence zone 110 (see FIG. 7) there is a desired room air condition.

Preferably, the introduction nozzles are fitted to the room ceiling, and also in the room, the entrance doors can have an air shower so that persons entering the room 110 in a very hot state, more rapidly become accustomed to a cooler room climate, because at some distance from the door greater mixing with the room air takes place. Simultaneously, the known door effects, namely the penetration of warm air, can be prevented by such an air shower. Optionally, both the valve 138 and the displacement of the cone 119 can be remotely controlled.

Equivalent elements, components and steps can be substituted for the ones set forth above so that they perform the same function in the same way and achieve the same result.

Having thus described the invention, what is claimed and desired to be secured by Letters Patent is:

1. A method for regulating the climate in a room in which the actual values of heat load, humidity load, and carbon dioxide load are determined and regulated to a desired value in temperature, the steps of the method comprising:

a) providing an air supply comprising of an external air source having a humidity and a carbon dioxide concentration;

b) separating the air supply into two separate partial air flows;

c) cooling a first partial air flow of the two separate partial flows to a saturation temperature;

d) mixing the cooled first partial air flow with a second partial air flow of the two separate partial flows;

e) forming a mist in the mixed air flow, the mist comprising condensed water droplets;

f) removing the condensed water droplets from the mist to form a treated air source; and g) supplying the treated air source to the room.

2. The method of claim 1, wherein the step of removing the condensed water droplets from the mist is accomplished by an adiabatic process.

3. The method of claim 1, wherein a demister is used, based upon a capillary action, in the step of removing the condensed water droplets from the mist.

4. The method of claim 1, wherein a slush ice-cooled heat exchanger is used in the step of cooling the first partial air flow.

5. The method of claim 1, wherein the air supply further comprises internal air removed from the room whose climate is to be regulated.

* * * * *